(No Model.) 2 Sheets—Sheet 1.
W. H. KILBOURN.
SYSTEM FOR STOPPING MACHINES.
No. 422,948. Patented Mar. 11, 1890.
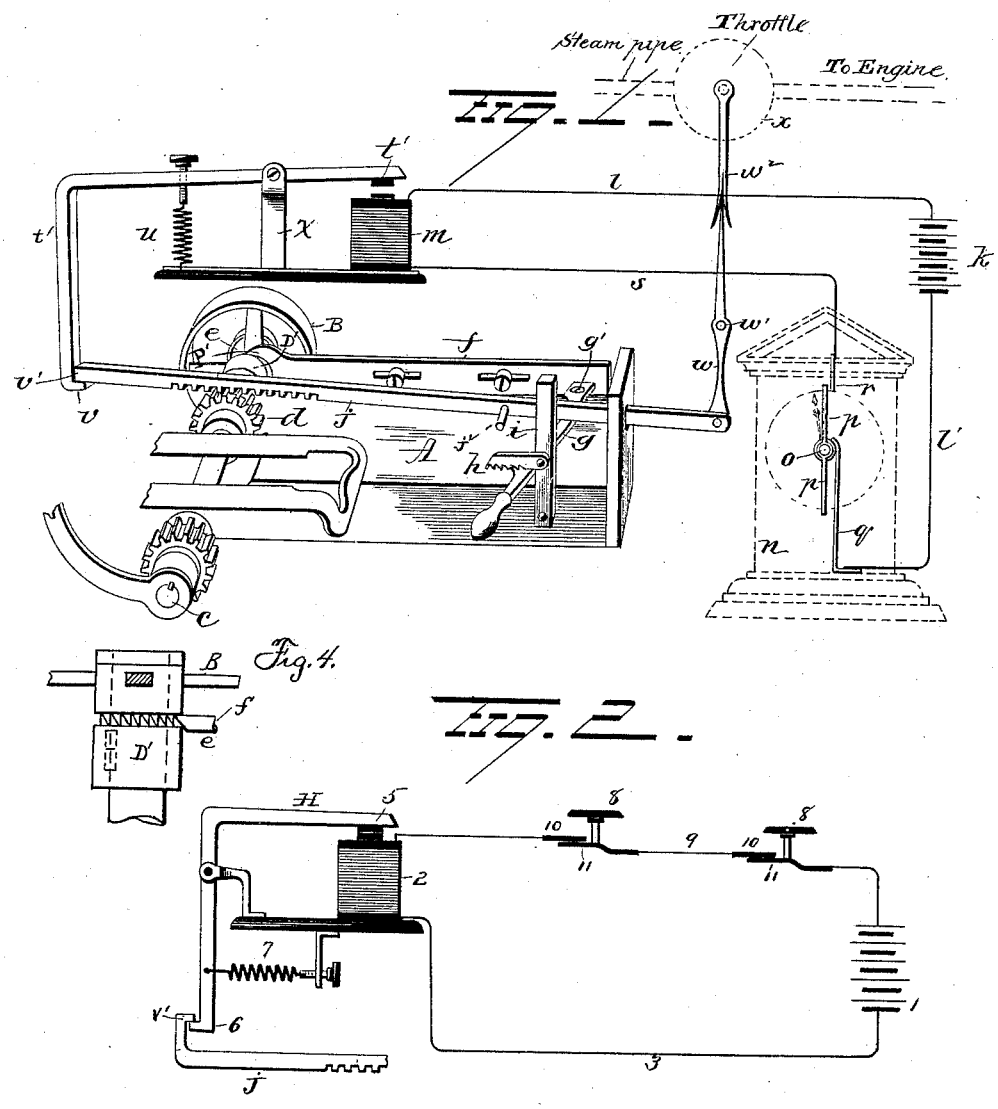

(No Model.) 2 Sheets—Sheet 2.
W. H. KILBOURN.
SYSTEM FOR STOPPING MACHINES.
No. 422,948. Patented Mar. 11, 1890.
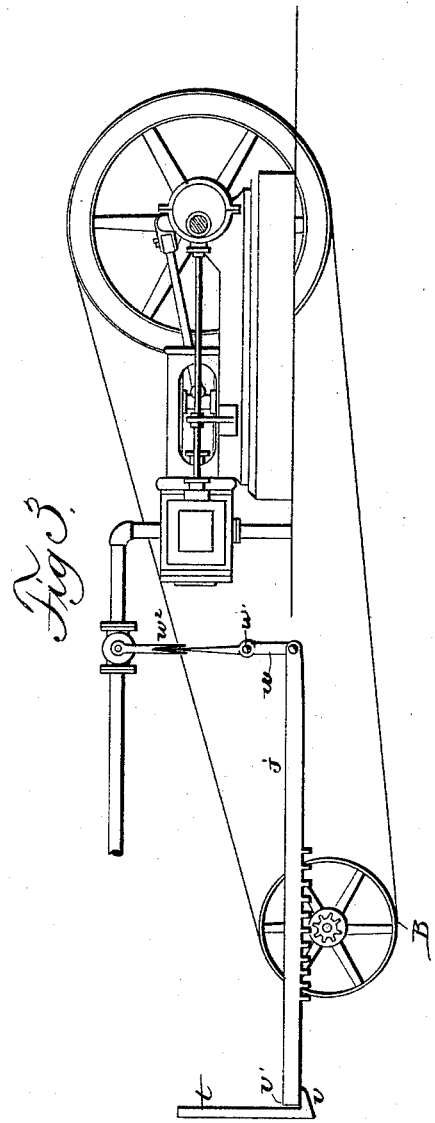
Witnesses
J. G. Nottingham
V. E. Hodges
Inventor
W. H. Kilbourn
By his Attorneys
Leggett & Leggett

UNITED STATES PATENT OFFICE.

WASHINGTON H. KILBOURN, OF OLEAN, NEW YORK.

SYSTEM FOR STOPPING MACHINES.

SPECIFICATION forming part of Letters Patent No. 422,948, dated March 11, 1890.

Application filed January 19, 1889. Serial No. 296,870. (No model.)

*To all whom it may concern:*

Be it known that I, WASHINGTON H. KILBOURN, of Olean, in the county of Cattaraugus and State of New York, have invented certain new and useful Improvements in Electrical Systems for Stopping Machines; and I do hereby declare the following to be a full, clear, and exact description of the invention, such as will enable others skilled in the art to which it appertains to make and use the same.

My invention relates to an improvement in automatic stop motions for machines.

The object is to provide a system of mechanism whereby machinery may be stopped almost instantaneously at any predetermined time.

With this end in view my invention consists in certain features of construction and combination of parts as will be hereinafter described, and pointed out in the claims.

In the accompanying drawings, Figure 1 represents a portion of one form of automatic stop mechanism applied thereto, and Fig. 2 represents a modification of frame. Fig. 3 is a view showing the cut-off mechanism connected with a steam-engine, and Fig. 4 is a view of the clutch.

For the purposes of convenience I have shown the improvements applied to the stop mechanism of a knitting-machine, (shown in Patent No. 390,375, granted to me October 2, 1888;) but I do not confine the application of same to any particular machine, as it is applicable to numerous other machines, and can be used thereon with good results.

A represents the bed of the machine and $c$ the main driving-shaft mounted therein and provided with gearing for transmitting motion to the moving parts of the machine. Loosely mounted on the shaft $c$, at or near one end, is a band-wheel B. Rigidly mounted on the shaft is a sleeve D', the edge of which, with the adjacent edge of the pulley, forms a clutch $e$, the tendency of which latter being to normally hold the band-wheel locked to the shaft. The sections of the clutch $e$ are disengaged by means of the shifter-bar $f$, which is mounted in suitable bearings and provided with elongated slots or similar means, through which pins extend and permit the bar to slide endwise. One end of this bar terminates in a fork P', which is beveled on its concaved edge and adapted to enter between the hub of pulley B and the sleeve D' in disconnecting the parts of the clutch. The shifter-bar $f$ is attached at its rear end to the lever $g$, which latter is fulcrumed at $g'$, on top of bed or block A, and connected near its outer free end to the toothed plate $h$, pivoted to the rocking bar $i$.

A bar $j$ is located above shaft $c$, and is provided on its lower face with teeth adapted, when the bar is lowered, to engage the wheel $d$, rigidly secured on the shaft $c$, and slide-bar $j$ rearwardly. This bar is provided with a projecting pin or lug $j'$, which is adapted, when the bar $j$ is shifted rearwardly, to engage standard $i$ and tilt same rearwardly, and the standard in turn moves lever $g$, which latter moves the shifting-bar $f$ forwardly to disengage the clutch-sections and leave the shaft $c$ free to come to a standstill and the wheel B free to be revolved by the driving-belt from the engine until the latter stops.

Pivoted in a suitable standard X is a bent lever $t$, provided at one end with an offset or toe $v$, to receive the end $v'$ of the rack-bar and hold the same normally supported out of contact with the pinion $d$. The opposite end of the bent lever $t$ is provided with a soft-iron armature $t'$, adapted to be attracted by an electro-magnet $m$, located in proximity thereto, said armature being maintained normally out of contact with the magnet by means of the spring $u$. One end of the helix of the magnet $m$ is connected by means of a wire $l$ with one pole of a battery $k$, while the other end of said helix is electrically connected with the opposite pole of the battery by wires $s\ l'$, and includes a circuit-closer Y. This circuit-closer comprises two contact-springs $q\ r$ and revolving arms $p$. The arms $p$ are secured to and carried by the arbor $o$ of a clock-work $n$, said arbor being the one upon which the hour-hand is usually mounted. The contact-spring $q$ is fixed to the frame of the clock, so that its free end will bear with a yielding pressure upon the arbor $o$ and thus connect the arms $p$ with one pole of the battery. The contact-spring $r$ is fixed to the clock-frame, and projects into the path of the arms $p$, so that when the arbor $o$ revolves the arms $p$ will alternately make contact with the contact-spring $r$ and close the circuit through the helix of the electro-magnet. The number of arms $p$ employed will preferably be two; but any desired number may be used, according to the number of stops it is desirous to make in twelve hours or during one revolution of the arbor $o$. One of the rack-bars $j$ is pivoted to one end of a lever $w$, and the latter rocks on a shaft or post $w'$. The lever $w$ is so arranged that one end will be in position to operate the forked arm $w^2$, connecting with the throttle-valve $x$ of the engine. It will be seen that the magnet $m$ is in a normally-open circuit and the lever $t$ permitted to hold the rack $j$ away from the pinion $d$. When one of the arms $p$ comes into contact with the contact-spring $r$, the circuit is completed, the armature $t$ attracted by the magnet $m$, and the rack $j$ released and permitted to be engaged by the pinion $d$. Thus it will be seen that as soon as the rack is dropped its engagement with the teeth of the pinion $d$ will cause it to reciprocate and the clutch on shaft $c$ will be separated, through the intervention of the standard $i$, lever $g$, and shifter-bar $f$, and the shaft $c$ allowed to come to a standstill. At the same time the lever $w$ will be vibrated and the throttle-valve of the engine closed.

Having fully described my invention, what I claim as new, and desire to secure by Letters Patent, is—

1. The combination, with a driven shaft, a battery and electro-magnet, and a bar-supporting device controlled by said electro-magnet, of a bar suspended above the shaft and adapted when dropped to be moved by said shaft, and devices actuated by the bar for cutting off the driving-power from the shaft, substantially as set forth.

2. The combination, with an actuating-shaft, a pinion thereon, a suspended rack-bar, and clutch and unclutching mechanism, of a battery, electro-magnet, a rack-bar-controlling device actuated by the magnet, and devices actuated by the rack-bar for operating the clutch, substantially as set forth.

3. The combination, with an actuating-shaft, a pinion thereon, a rack-bar suspended over the pinion, and clutch mechanism and unclutching mechanism adapted to be operated by the rack-bar, of a hanger supporting the rack-bar, a magnet for actuating the hanger, and means whereby an electric circuit, including the magnet, may be opened or closed at predetermined intervals, substantially as set forth.

4. In a system for stopping engines, the combination, with a machine and an engine, of an electro-magnet, a circuit-closer, an electric circuit including said magnet and circuit-closer, clock-work for actuating said circuit-closer, and devices controlled by the electro-magnet whereby the power will be cut off from the machine at certain predetermined intervals.

In testimony whereof I have signed this specification in the presence of two subscribing witnesses.

WASHINGTON H. KILBOURN.

Witnesses:
F. S. BLAKESLEE,
J. K. FOOTE, Jr.